US012574464B2

(12) United States Patent
Gary et al.

(10) Patent No.: US 12,574,464 B2
(45) Date of Patent: Mar. 10, 2026

(54) METHODS AND SYSTEMS TO PROVIDE ADAPTABLE BILLING FOR DEVICES WITHIN A GEOGRAPHIC ZONE

(71) Applicant: T-Mobile Innovations LLC, Overland Park, KS (US)

(72) Inventors: Robert Gary, Issaquah, WA (US); Dan Hogberg, Redmond, WA (US); Nicholas LaVassar, Issaquah, WA (US); Christopher Painter, Bellevue, WA (US)

(73) Assignee: T-Mobile Innovations LLC

( * ) Notice: Subject to any disclaimer, the term of this patent is extended or adjusted under 35 U.S.C. 154(b) by 442 days.

(21) Appl. No.: 18/171,616

(22) Filed: Feb. 20, 2023

(65) Prior Publication Data

US 2024/0283871 A1 Aug. 22, 2024

(51) Int. Cl.
| | |
|---|---|
| *H04W 4/24* | (2024.01) |
| *H04M 15/00* | (2006.01) |
| *H04W 4/021* | (2018.01) |

(52) U.S. Cl.
CPC ....... *H04M 15/8033* (2013.01); *H04W 4/021* (2013.01); *H04W 4/24* (2013.01)

(58) Field of Classification Search
CPC .. H04M 15/8033; H04M 15/66; H04M 15/80; H04M 15/8022; H04W 4/021; H04W 4/24; H04L 12/1407

USPC .......................................................... 455/406
See application file for complete search history.

(56) References Cited

U.S. PATENT DOCUMENTS

| | | | | | |
|---|---|---|---|---|---|
| 2007/0184815 | A1* | 8/2007 | Aebi | ..................... | H04M 15/41 |
| | | | | | 455/406 |
| 2011/0035336 | A1* | 2/2011 | Cai | ................... | H04M 15/8044 |
| | | | | | 705/400 |

FOREIGN PATENT DOCUMENTS

AU         2014203142 B2 *   4/2016

* cited by examiner

*Primary Examiner* — Huy C Ho

(57) ABSTRACT

A method comprises obtaining a location of the device registered with a carrier network in association with a subscription account, wherein the subscription account comprises a home network subscription plan associated with a home network device registered with the carrier network, wherein the device is registered with the carrier network under a data plan separate from the home network subscription plan, determining a location of the home network device and a geographic zone around the home network device based on the device, and transmitting an instruction to a billing system in the carrier network to adapt the data plan associated with the device to a reduced billing rate when the location of the device is within the geographic zone around the home network device.

20 Claims, 8 Drawing Sheets

300

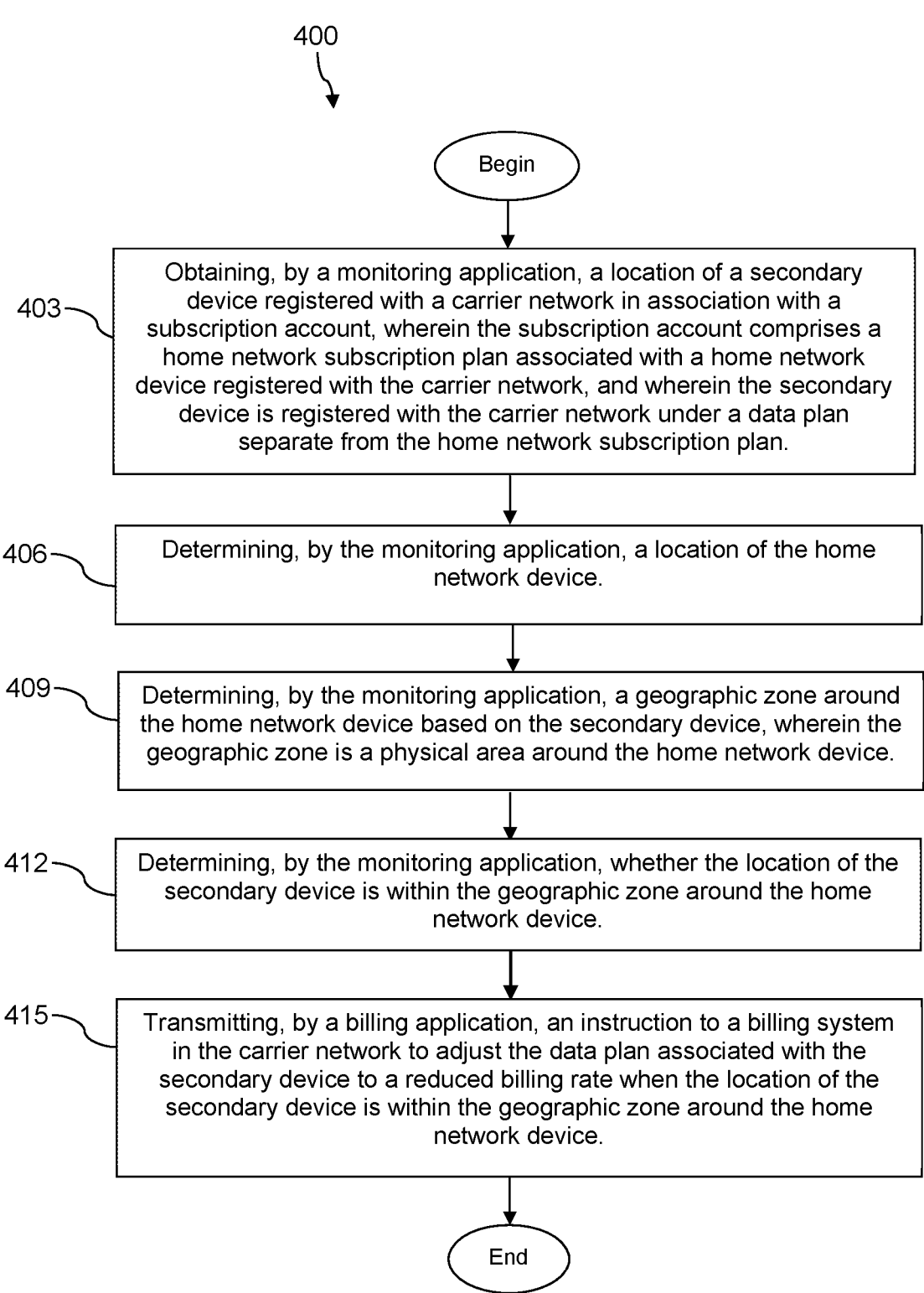

400

Begin

403 — Obtaining, by a monitoring application, a location of a secondary device registered with a carrier network in association with a subscription account, wherein the subscription account comprises a home network subscription plan associated with a home network device registered with the carrier network, and wherein the secondary device is registered with the carrier network under a data plan separate from the home network subscription plan.

406 — Determining, by the monitoring application, a location of the home network device.

409 — Determining, by the monitoring application, a geographic zone around the home network device based on the secondary device, wherein the geographic zone is a physical area around the home network device.

412 — Determining, by the monitoring application, whether the location of the secondary device is within the geographic zone around the home network device.

415 — Transmitting, by a billing application, an instruction to a billing system in the carrier network to adjust the data plan associated with the secondary device to a reduced billing rate when the location of the secondary device is within the geographic zone around the home network device.

End

5G NR Access Network 554a        554b        554c gNB        gNB    • • •    gNB

559

Application Server

558

5G Core Network

560

Network

700

METHODS AND SYSTEMS TO PROVIDE ADAPTABLE BILLING FOR DEVICES WITHIN A GEOGRAPHIC ZONE

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Telecommunications service carrier companies (also referred to herein as "carriers") typically offer various types of devices, such as mobile phones, tablets, hotspot devices, wearable devices, etc., for sale in association with a subscription plan or a data plan. Carriers are increasingly providing home network subscription plans for purchase as well, to provide at-home Internet services to subscribers. The carrier may provide and/or install a home network device at the home of the subscriber to provide the Internet services according to the home network subscription plan. A home network device may be, for example, a wireless router, modem, or gateway, that may act as a wireless access point to provide other devices in a particular location access to the wireless local network. For example, the home network subscription plan may offer Wi-Fi Internet service to all the devices connected to the home network device.

In some cases, a subscriber of the carrier may purchase the home network device with a home network subscription plan, and one or more other devices, which may be a data-plan-enabled device or a Wi-Fi enabled device. When the device is a data-plan-enabled device, the subscriber may have purchased a data plan for the device to ensure the device is connected to the Internet regardless of a location of the device. When the device is a Wi-Fi-enabled device, the subscriber may not purchase a data plan for the device, but instead may use an at-home Wi-Fi Internet service to access the Internet through the device.

SUMMARY

In an embodiment, a method performed by a billing adaptor system to adjust a billing rate of a device linked to a subscription account including a home network subscription plan is disclosed. The method comprises determining, by a monitoring application of the billing adaptor system, a location of a home network device or a primary device, wherein the home network device or the primary device provides a wireless access point to a home local area network according to the home network subscription, obtaining, by the monitoring application, a first location of a device, wherein the device and the home network device are subscribed with a carrier network under a common subscription account, determining, by the monitoring application, a geographic zone around the home network device or the primary device, based on the device, determining, by the monitoring application, that the first location of the device is within the geographic zone, transmitting, by a billing application of the billing adaptor system, a first instruction to a billing system in the carrier network to adjust a data plan associated with the device when the first location of the device is within the geographic zone, determining, by the monitoring application, that a second location of the device, different from the first location of the device, is external to the geographic zone, and transmitting, by the billing application, a second instruction to the billing system to adjust the data plan associated with the device when the second location of the device is external to the geographic zone.

In another embodiment, a method performed by a billing adaptor system to adjust a billing rate of a device within a geographic area is disclosed. The method comprises obtaining, by a monitoring application of the billing adaptor system, a location of the device registered with a carrier network in association with a subscription account, wherein the subscription account comprises a home network subscription plan associated with a home network device registered with the carrier network, wherein the device is registered with the carrier network under a data plan separate from the home network subscription plan, determining, by the monitoring application, a location of the home network device, determining, by the monitoring application, a geographic zone around the home network device based on the device, wherein the geographic zone is a physical area around the home network device, determining, by the monitoring application, whether the location of the device is within the geographic zone around the home network device, and transmitting, by a billing application of the billing adaptor system, an instruction to a billing system in the carrier network to adapt the data plan associated with the device to a reduced billing rate when the location of the device is within the geographic zone around the home network device.

In yet another embodiment, a system is disclosed. The system comprises at least one processor, at least one non-transitory memory, a monitoring application of a billing adaptor system, stored in the at least one non-transitory memory, which when executed by the at least one processor, causes the at least one processor to be configured to determine a geographic zone around a home network device or a primary device based on a device, wherein the device, the primary device, and the home network device are subscribed with a carrier network under a common subscription account, obtain a first location of the device, when the first location of the device is within the geographic zone, a billing application of the billing adaptor system, stored in the at least one non-transitory memory, which when executed by the at least one processor, causes the at least one processor to be configured to transmit a first instruction to a billing system in the carrier network to adjust a data plan associated with the device, after transmitting the first instruction, the monitoring application causes the at least one processor to be configured to determine that a second location of the device, different from the first location of the device, is external to the geographic zone, and when the second location of the device is external to the geographic zone, the billing application causes the at least one processor to be configured to a second instruction to the billing system to adjust the data plan associated with the device.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIG. 4 is a flow chart of a first method performed by a billing adaptor system in the communications system of FIG. 1 according to an embodiment of the disclosure.

DETAILED DESCRIPTION

Figure 1:
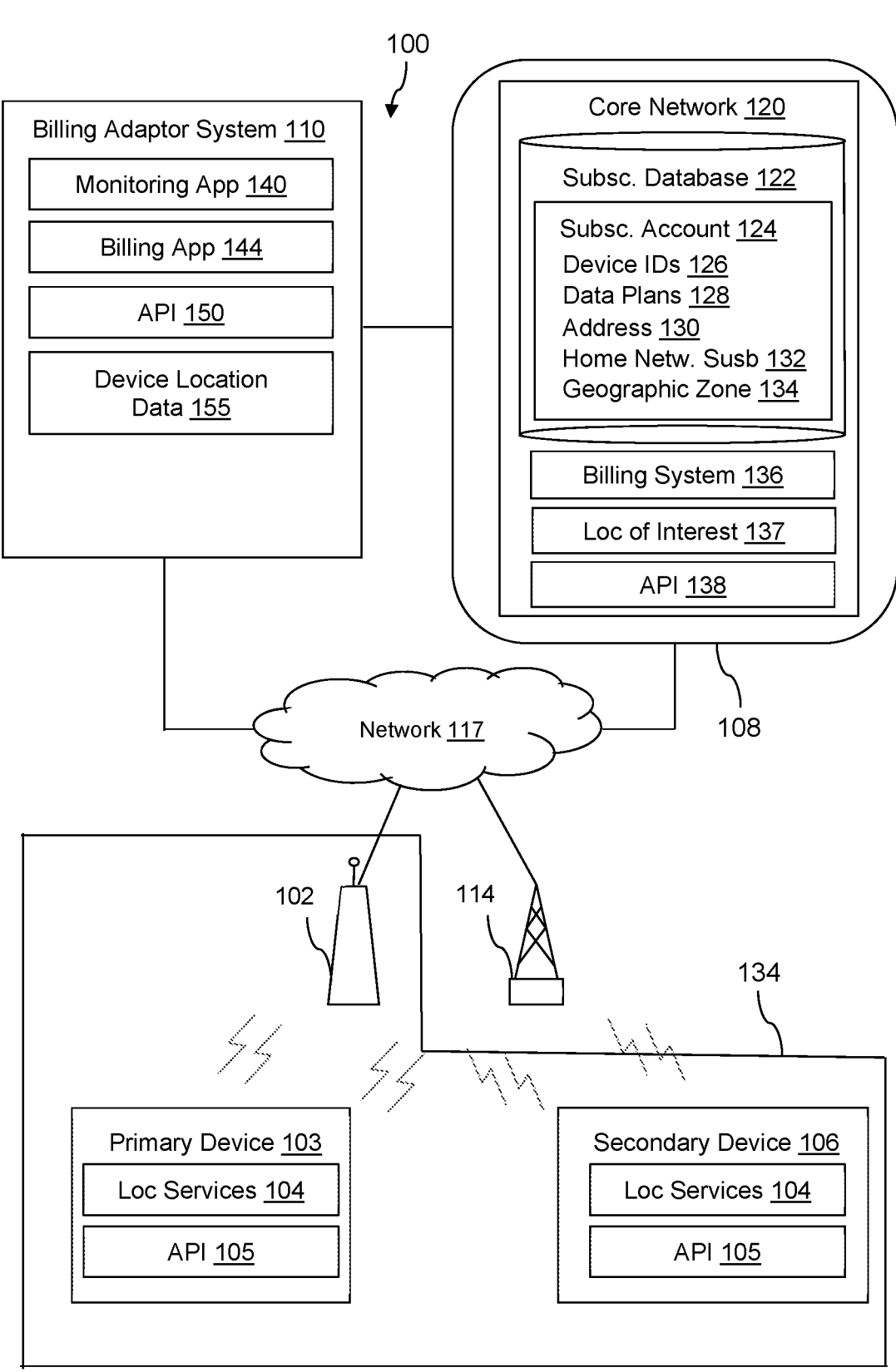
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

As mentioned above, a customer or subscriber of a carrier may purchase a home network device with a home network subscription plan, and one or more other data-plan-enabled devices. The home network device and the other devices may each be registered with the carrier network under a subscription account of a particular subscriber. Each of the data-plan-enabled devices may be linked to an individual data plan or rate plan, subscribed for and paid for by the subscriber.

Often times, data-plan-enabled devices may be located at home, within range of the home network device, such that the device may be theoretically connected to the Internet via the home network device instead of using the dedicated data plan. Nevertheless, this data-plan-enabled device may still operate independent from the home network device and connect to the carrier network and the Internet based on the paid for, dedicated data plan.

For example, a data-plan-enabled device may be a camera positioned in a backyard of the subscriber's home, and the camera may send and receive data via a carrier network according to a dedicated data plan subscribed to by the subscriber. The camera may not be connected to the home network device, but may still be located in the home of the subscriber, within a predefined range from the home network device or another device registered with the carrier that may serve as a wireless access point. The predefined range may be a Wi-Fi signal range, in which the signals transmitted from the device are detectable by other devices. The predefined range may vary from device to device based on various factors, such as the strength of the transmitter, physical obstructions, and radio interference. However, when the camera is not connected to the home network device to use the home network but is still located in the home, the data transmitted to and from the camera may still be driven through the home network device and/or through the same service cell or macro cell associated with the carrier network.

Therefore, data-plan-enabled devices that are located within a range of a home network device, or other registered wireless access point, may still be routed through the home network even though the data-plan-enabled device is billed as a completely separate communication line from the home network subscription line. In other words, some devices may be billed as completely separate communication lines, even though the devices receive communication services over the top of another device (e.g., home network device, wireless access point, etc.) that is already paying for communication service. This may be viewed as double billing, which increases the consumption of computing and network resources used to separately bill the subscriber twice for using the same network resources. This may also discourage customers to purchase data-plan-enabled devices from the carrier, when a Wi-Fi enabled device could be used instead in a more cost-effective manner. Therefore, the foregoing presents a technical problem rooted in the technology of carrier network architectures.

The present disclosure teaches a particular technical solution to this technical problem. The embodiments disclosed herein are directed to methods and systems for detecting when data-plan-enabled devices are or could be accessing the carrier network through an already billed device (e.g., home network device or primary device), and then adapting the billing rate for the secondary device to a zero rate or reduced rate accordingly. In an embodiment, a billing and adaptor system may perform the determination based on a proximity of a data-plan-enabled device (hereinafter referred to as a "secondary device") to a home network device or other primary device that may act as a wireless access point. The billing and adaptor system may use the geographic proximities between devices to make a technical decision to adjust a billing rate of a device, without needing to trace the traffic path of the device periodically. The decision regarding billing adjustments may also result in simplifying the routing of the traffic for the device (i.e., through the home network device), which also reduces the need to monitor or restrict the routing as closely. The network may thus provide an optimal routing scheme for the device, which in turn improves service and reliability during a session, while simplifying the billing in terms of monitoring and reporting.

As mentioned above, the home network device may be a modem, wireless router, or gateway configured to provide at-home Internet access to multiple devices within a predefined range of the home network device. The primary device may be another device registered to, or subscribed with the carrier network, under the same subscription account as the home network device. In some cases, the primary device may be operable as a wireless access point for one or more secondary devices, also subscribed with the carrier network under the same subscription account. In this case, the primary device may be a mobile phone or tablet with hotspot capabilities. In an embodiment, the primary device may be a mobile phone, a tablet, a wearable device, a SYNCUP drive, or any other type of device with a known location, that may serve as a wireless access point. The secondary device that may receive an adapted billing rate may be any device, such as a mobile phone, a tablet, a wearable device, an Internet of Things (IoT) device, a camera, a dog collar, a sensor, and/or any other type of data-plan-enabled device that may have a data connection with the carrier network.

In an embodiment, the determination of the proximity of the secondary device to the home network device or primary device may be based on a geographic zone around the home network device or primary device. The geographic zone may be a physical area surrounding the home network device or primary device. For example, the geographic zone may indicate a radius around the home network device or primary device. In another case, the geographic zone may correspond with the plot lines of a home of the subscriber, or another location of interest. In yet another case, the subscriber may manually define the geographic zone around a home of the subscriber or a location of interest, for example, via a user interface.

In an embodiment, the geographic zone may vary for different secondary devices based on, for example, a type of secondary device, a quality of service requirement for the secondary device, or an amount of network resources consumed by the secondary device. For example, a secondary device such as a wireless communication device embedded in a dog collar may not consume a heavy amount of network resources during uploading or downloading of data, and as such may have a wider geographic zone than a camera, for example, which consumes a far heavier amount of network resources during the uploading and downloading of data. Similarly, a smart home hub may have a higher quality of service requirement than a refrigerator temperature sensor, and thus the smart home hub may have a wider geographic zone than the refrigerator temperature sensor.

In an embodiment, a subscriber may set a policy for the different types of secondary devices, different quality of service parameters, or different network resource consumption statistics, and associate a different geographic zone (or range of zones) based on the policy. For example, a subscriber may preset a certain radius range from the home network device or primary device to determine the geographic zone for secondary devices that are camera devices, or devices which use a certain amount of bandwidth. In another embodiment, the carrier may have preset policies for the different types of secondary devices, different quality of service parameters, or different network resource consumption statistics, such that the geographic zone may be properly determined for each secondary device. For example, the carrier may set default policies for different types of secondary devices, such that particular device types are assigned a respective geographic zone range or radius.

In an embodiment, a monitoring application in the billing and adaptor system may determine the geographic zone for a secondary device based on the policies and/or various factors. For example, the monitoring application may query a subscription database at a core network of the carrier network, to receive a home address associated with the subscription account. The monitoring application may determine the geographic zone based on the home address, and, for example, a radius around the home address, or a plot line around the home address based on the policies.

In an embodiment, the monitoring application may monitor devices within the geographic zone, for example, upon a device entering the geographic zone, upon a device connecting to the home network device or primary device, or periodically based on a preset schedule. The monitoring application may detect that a secondary device has entered the geographic zone, and collect data describing the secondary device, such as a device identifier of the secondary device. A device identifier may be a Mobile Subscriber Integrated Services Digital Network (MSISDN) number uniquely identifying a subscription of the device, an International Mobile Subscriber Identity (IMSI) identifying a Subscriber Identity Module (SIM) card or profile of the device, or any other value uniquely assigned to a device that is registered with the carrier.

The detection of a secondary device entering the geographic zone, and thus the determination of the location of the secondary device, may be performed in a variety of different ways. In one embodiment, the secondary device may be Global Positioning System (GPS)-enabled with a GPS receiver, and thus may transmit the location of the secondary device, for example, upon request. In a primary device, having a known location and within a certain communication range of the secondary device, may detect the presence of the secondary device using, for example, various types of communication connections (e.g., BLUETOOTH, Near Field Communications (NFC), etc.). The primary device may transmit, to the monitoring application, an indication that the secondary device is within communication range of the primary device, and the monitoring application may determine a location of the secondary device based on the known location of the primary device. In another embodiment, the monitoring application may determine a location of the secondary device using trilateration based on one or more cell sites, or by performing a Wi-Fi look up based on known locations of Wi-Fi access points with reported service set identifiers (SSIDs).

When the monitoring application detects the secondary device within the geographic zone, a billing application of the billing adaptor system may be triggered to transmit an instruction to a billing system in the core network of the carrier network. The instruction may be to adapt or adjust a data plan of the secondary device. In an embodiment, the instruction may be to reduce a billing rate of the data plan to a reduced rate or a zero rate, when the secondary device is registered with a dedicated data plan. In an embodiment, the billing system may reduce the billing rate of the data plan to zero. In this case, the subscriber may no longer separately pay for a data plan for the secondary device, when the secondary device is located within the geographic zone, or predefined area, in and around the home of the subscriber. Alternatively, the billing system may reduce the rate of the data plan by a percentage, for example, 75%, 50% or 25%. In an embodiment, the rate of reduction may be proportional to the distance that the secondary device is from the home network device or primary device. For example, if the geographic zone is based on a radius from the home network device, and the secondary device is located 9/10 of the radius from the home network device, then the monitoring system may instruct the billing system to reduce the data plan by 10%.

When the monitoring application detects that the secondary device is external to the geographic zone, and the secondary device is not linked to a particular data plan, the billing application may transmit an instruction to the secondary device to prompt the user to purchase a data plan to continue using the secondary device at the location. For example, the prompt may include one or more preset data plans that may be selected and purchased via a user interface on the secondary device. Upon selection, the secondary device may transmit an instruction to the billing system at the core network to set up billing services according to the selected data plan based on data usage of the secondary device. The billing system may create billing services on behalf of the subscriber for the secondary device, to perform payment functions for automating the process of collecting payments, sending out recurring invoices, expense tracking, invoice tracking, etc., based on the purchased data plan.

In another embodiment, the monitoring application may detect that the secondary device is external to the geographic zone and that the secondary device is not linked to a particular data plan. In this embodiment, the billing application may instruct the core network to discontinue network services for the secondary device.

After a period of time in which the secondary device is present in the geographic zone and the data plan has already been reduced, the monitoring application may detect that the secondary device has moved to a different location. The monitoring application may then detect whether the new location of the secondary device is within the geographic zone. When the new location of the secondary device is within the geographic zone, the monitoring application may maintain the reduced or zero billing rate of the data plan that was previously set. Alternatively, the monitoring application may increase or decrease the billing rate in the data plan for the secondary device based, for example, on the new location of the secondary device relative to the home network device or primary device. When the monitoring application detects that the secondary device has moved external to the geographic zone, the billing application may change the billing rate of the data plan back up to the original billing rate subscribed for by the subscriber, prompt the user to purchase a dedicated data plan, or instruct the core network to discontinue network services for the secondary device.

In an embodiment, the billing and adaptor system may adapt the billing rate for one or more devices registered with the carrier and owned by the subscriber, according to certain time intervals. For example, the carrier may offer reduced billing rates during certain scheduled time intervals for promotional purposes. In such a case, when the monitoring application detects that a registered device is within the geographic zone of a home network device or other primary device during the scheduled time interval, the billing application may instruct the billing system to adjust the billing rate of the device to a reduced or zero billing rate.

In an embodiment, the billing and adaptor system may adapt the billing rate for multiple devices registered with the carrier, when the devices enter a geographic zone of an event held at a point of interest. For example, the carrier may offer a promotion in which registered devices operating in a stadium during a particular football game is offered a reduced billing rate, only when the device is within the geographic region of the stadium and only during the time of the football game. In this case, the monitoring application may determine that the device is within the geographic zone of the stadium during the time of the football game. The billing application may instruct the billing system to adjust the billing rate of the device to the promoted reduced billing rate. The adjustment of the billing rate may be performed seamlessly in the background, without the user being aware of the billing rate adjustment or the user needing to take any action.

Therefore, the embodiments disclosed herein provide a technical solution to a technical problem in the technical field of telecommunications. The technical problem being solved involves the core network, and more specifically, the billing systems within the core networks having to separately compute and transmit invoices and billing details for different devices that are within range of a home network, even though the devices communicate through the same home network device and carrier network resources. The technical solution involves the use of a billing adaptor system that communicates with devices registered with the carrier, to eliminate the need to compute and deliver separate invoices for devices that are within a geographic zone of a home network device or primary device. From the subscriber perspective, this process is performed seamlessly in the background, without user involvement, to receive the benefit of the zero or reduced billing rate. In addition, this process essentially removes the double billing effect of having multiple data-plan-enabled devices within a subscriber's home, which is also subscribed to a home network subscription plan.

Turning now to FIG. 1, a communication system 100 is described. The system 100 comprises a home network device 102, a primary device 103, a secondary device 106, a carrier network 108, a billing adaptor system 110, a cell site 114, and a network 117. The primary device 103 and the secondary device 106 may be data-plan-enabled devices that may be communicatively coupled to the carrier network 108, network 117, and/or the billing adaptor system 110 via the cell site 114 or the home network device 102.

The home network device 102 may be a modem, wireless router, and/or gateway configured to provide Internet access to multiple devices within a local area network associated with a home of a subscriber via, for example, the carrier network and network 117. The primary device 103 may be a cell phone, a mobile phone, a smart phone, a personal digital assistant (PDA), a SYNCUP drive, a wearable computer, a headset computer, a laptop computer, a tablet computer, or a notebook computer. In an embodiment, the primary device 103 may be enabled to act as a hotspot for providing Internet access to one or more other devices within range of the primary device 103. The secondary device 106 may be a cell phone, a mobile phone, a smart phone, a tablet computer, an Internet of Things (IoT) device, a wearable computer, a camera, a wireless communication device embedded in a dog collar, a sensor, or any other type of device that is enabled to have a data connection with the carrier network 108 and the Internet.

Both the primary device 103 and the secondary device 106 may be enabled with location services 104. The location services 104 may be used to determine a location of the device 103 and 106. For example, the device 103 and 106 may include a GPS receiver to determine a location. The device 103 and 106 may use GPS and BLUETOOTH, along with hotspots and cell tower locations to determine an approximate location of the device. The device 103 and 106 may use various other types of location services 104, which are not limited herein.

Both the primary device 103 and the secondary device 106 may also be configured with application programming interfaces (APIs) 105, which may be used to communicate with one another, the billing adaptor system 110, or the core network 120. In an embodiment, the home network device 102, the primary device 103, and the secondary device 106 are all subscribed to the carrier network 108, under the same subscription account 124.

The cell site 114 provides the primary device 103 and the secondary device 106 a wireless communication link to the carrier network 108, network 117, and/or the billing adaptor system 110 according to a 5G, a long term evolution (LTE), a code division multiple access (CDMA), or a global system for mobile communications (GSM) wireless telecommunication protocol. The network 117 may be one or more private networks, one or more public networks, or a combination thereof. While FIG. 1 shows the carrier network 108 as being separate from the network 117, it should be appreciated that, in some embodiments, at least a portion of the carrier network 108 may be part of the network 117.

The carrier network 108 may be a network including a RAN and a core network 120. The RAN may include the access network containing the radio elements of a cell network, and the core network 120 may include the elements that manage the subscriber information, call setup and routing, and related system supports. In an embodiment, the core network 120 may be an evolved packet core (EPC) core network. The core network 120 may be configured to implement a 5G, a LTE, a CDMA, or a GSM wireless telecommunication protocol. In one embodiment, the core network 120 may be a 3rd Generation Partnership Project (3GPP) Evolved Packet System (EPS).

As shown in FIG. 1, the core network 120 may include a subscription database 122, one or more billing systems 136, one or more locations of interest 137, and one or more APIs 138. In an embodiment, the subscription database 122 may be embodied similar to a Subscription Profile Repository (SPR) and an Application Function (AF) in a standard core network. The subscription database 122 may include information describing one or more subscription accounts 124, which each relate to a bookkeeping account maintained by the carrier, including information identifying the subscriber (e.g., name and a home address 130), information describing each of the devices purchased by the subscriber (e.g., device identifier 126), data plans 128 purchased with relation to each device, a home network subscription plan 132, and one or more geographic zone 134. The information identifying the subscriber may include the name of the subscriber, an account number, a home address 130 of the subscriber, payment information, and/or other identification information. A device identifier 126 may be an MSISDN, an IMSI, or any other value uniquely assigned to a device that is registered with the carrier. The data plans 128 may be an agreement between the carrier and the subscriber that specifies how much mobile data a particular device of the subscriber may access, usually per month, for a particular billing rate (also referred to herein as an "original billing rate"). The home network subscription plan 132 is another agreement between the carrier and the subscriber that specifies a billing rate for providing at-home Internet services using a home network device 102 provided by the carrier.

The geographic zone 134 may be a physical area surrounding the home network device 102 or primary device 103, as described above and shown in FIG. 1. As shown in FIG. 1, the geographic zone 134 is an area encompassing home network device 102, the primary device 103, and the secondary device 106. In an embodiment, the geographic zone 134 may only cover an area around either the home network device or the primary device 103. The geographic zone 134 may also include one or more secondary devices 106 when the secondary devices 106 enter the geographic zone 134.

In an embodiment, the geographic zone 134 may be associated with a physical address (e.g., home address 130), latitude and longitude ranges, property lines or plot lines of a property, city, county, or state, a distance radius, or any other method of storing an area of a physical location. The geographic zone 134 may also be implemented as a geofence, which may be a virtual boundary surrounding the geographic zone 134. In this case, each time a secondary device 106 enters or exits the geographic zone 134, the secondary device 106 may be triggered to transmit a location of the secondary device 106 to the monitoring application 140, or the monitoring application 140 may be triggered to determine the location of the secondary device 106.

As mentioned above, a geographic zone 134 may vary based on the type of secondary device 106 detected within the geographic zone 134, a requested quality of service parameter for the secondary device 106, and/or an amount of network resources consumed by the secondary device 106 during data transmission. In an embodiment, the subscription account 124 may maintain a mapping between the geographic zones 134 (e.g., a radius or area around the home network device 102 or primary device 103) and the associated types of devices (e.g., camera devices, pet devices, sensor devices, mobile communication devices, in-vehicle devices, etc.). The mapping may be a default mapping set by the carrier, or may be provided by the subscriber during registration or via a carrier application/website. For example, the mapping may indicate that pet devices may be allocated a 100-yard radius from a location of the home network device as the geographic zone 134, while camera devices may be allocated a 10-yard radius from the location of the home network device as the geographic zone 134. The subscription account 124 may also maintain a mapping between the geographic zones and the associated quality of service parameters, which are subscribed for by the subscriber with relation to the secondary device 106. This mapping may also be a default mapping set by the carrier, or may be provided by the subscriber. For example, the mapping may indicate that devices that are not guaranteed any quality of service parameters may be allocated a 100-yard radius from a location of the home network device as the geographic zone 134, while devices that are guaranteed a certain bandwidth may be allocated a 10-yard radius from the location of the home network device as the geographic zone 134.

The core network 120 may also include one or more billing systems 136. A billing system 136 may be responsible for implementing the processes for billing and invoicing subscribers. Each billing system 136 may include servers and databases storing information describing the subscriber and billing details for each subscriber. For example, each billing system 136 may include payment functions for automating the process of collecting payments, sending out recurring invoices, expense tracking, invoice tracking, etc. In some embodiments, the billing system 136 may adapt or adjust a billing rate in a data plan 128, according to an instruction receiving from a billing adaptor system 100, as further described herein.

The core network 120 may also store a location of interest 137. The location of interest 137 may refer to a location of a particular event, for example, for which the carrier is offering a promotion of a reduced billing rate to customers and subscribers. The APIs 138 in the core network 120 may be used to communicate with the billing adaptor system 110 and/or the devices 103 and 106.

The billing adaptor system 110 may include a monitoring application 140, a billing application 144, one or more APIs 150, and device location data 155. The monitoring application 140 may determine a geographic zone 134 and detect when secondary devices 106 enter the geographic zone 134, as further described herein. The billing application 144 may transmit an instruction to the billing system 136 when a secondary device 106 enters the geographic zone 134, such that the secondary device 106 is permitted to receive a reduced billing rate, as further described herein. The APIs 150 may be used to communicate with the core network 120 and/or the devices 103 and 106. The device location data 155 may refer to locations of the home network device 102, primary device 103, and/or the secondary device 106, which may be collected or determined by the monitoring application 140. The device location data 155 may include the actual locations of the home network device 102, primary device 103, and/or the secondary device 106, approximate locations of the home network device 102, primary device 103, and/or the secondary device 106, geo-tagged location of nearby wireless access points or cell towers, etc.

FIG. 1 shows the billing adaptor system 110 as separate from the core network 120 and the carrier network 108. For example, the billing adaptor system 110 may be stored in a cloud computing environment external to the core network 120 and the carrier network 108. In another embodiment not shown in FIG. 1, the billing adaptor system 110 may be part of the carrier network 108, either separate from the core network 120, or part of the core network 120. In either case, the billing adaptor system 110 may communicate with the core network 120 via a series of API calls, using the API 150 at the billing adaptor system 110 and the API 138 at the core network 120.

Figure 2:
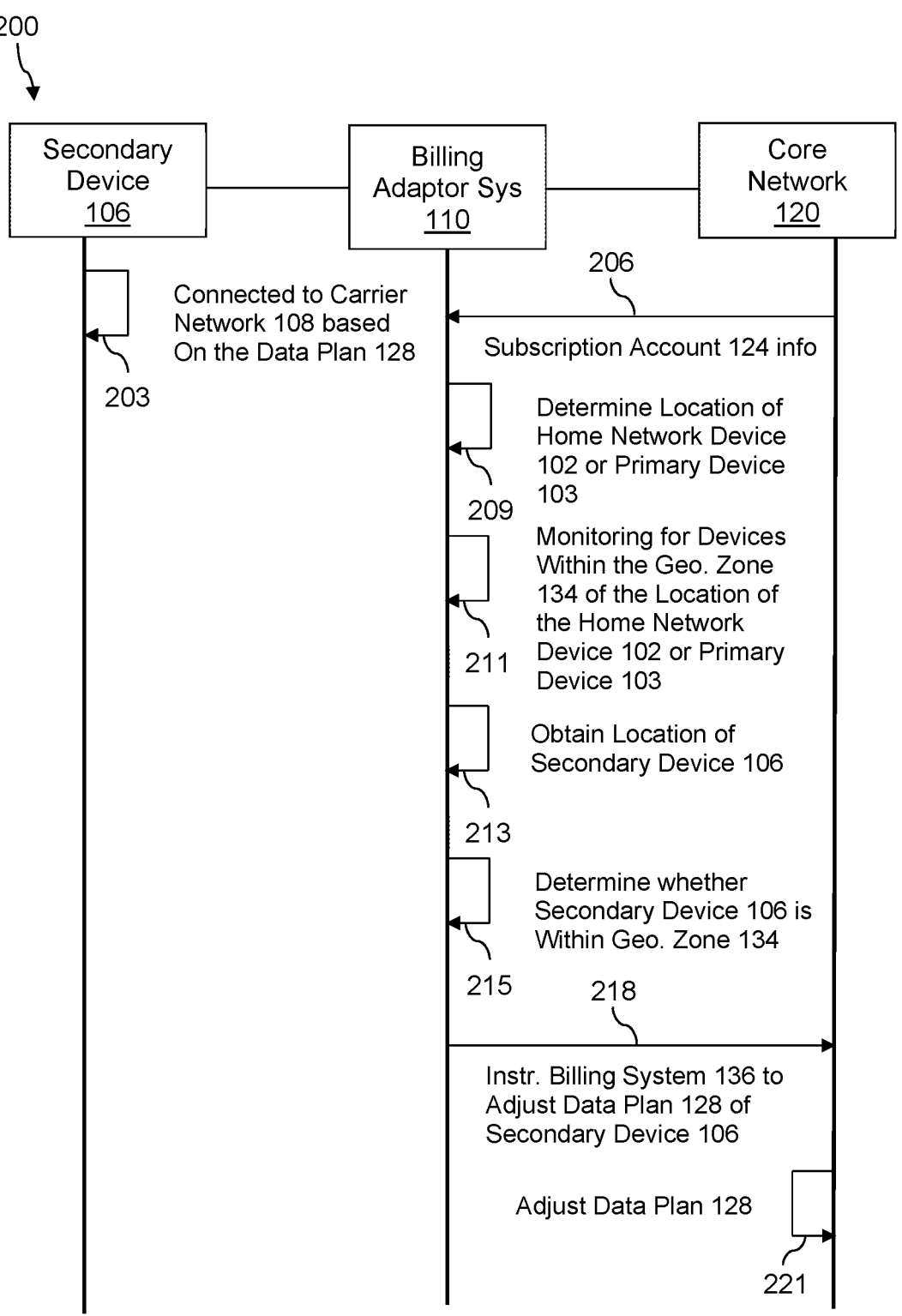
FIG. 2 is a message sequence diagram of a first example method performed by the communication system of FIG. 1 according to an embodiment of the disclosure.

Turning now to FIG. 2, shown is a message sequence diagram illustrating a method 200, performed by the secondary device 106, the billing adaptor system 110, and the core network 120. In an embodiment, method 200 may be performed after the subscriber has purchased the home network device 102, the home network subscription plan 132, the secondary device 106, and a data plan 128 with an original billing rate corresponding to the secondary device 106.

At step 203, the secondary device 106 may already be connected to the carrier network 108 and the Internet based on the data plan 128. In the example shown in method 200, the data plan 128 may be associated with the original billing rate, and the home network subscription plan 132 may be associated with another billing rate different from the first billing rate.

At step 206, which may be performed before or after step 203, the core network 120 may transmit information regarding a subscription account 124 that has, for example, paid for or opted-in to the service of reducing billing rates when a device is in the geographic zone 134. In an embodiment, the information regarding the subscription account 124 may be sent to the billing adaptor system 110 in response to a request or query sent by the billing adaptor system 110 for subscription accounts 124 that have opted-in for the reduced billing rate service. The subscription account 124 information may include device identifiers 126 of devices purchased by a subscriber linked to the subscription account 124, data plans 128 for each of the devices if available, a home address 130, a home network subscription plan 132, and one or more geographic zones 134. As the geographic zone 134 may vary based on various factors, the subscription account 124 information received at step 206 may include the mappings of geographic zones 134 to certain types of devices, quality of service parameters, or network resource consumption.

At step 209, the monitoring application 140 may determine a location of the home network device 102 and store the location in the device location data 155 as, for example, a fixed or known location of the home network device 102. In an embodiment, the monitoring application 140 may determine the location of the home network device 102 by receiving a home address 130 associated with the subscription account 124 from the core network 120. For example, the monitoring application 140 may request the core network 120 for an address associated with the subscription account 124 via API 150. The core network 120 may respond with the home address 130 in the subscription account 124 via API 138. In another embodiment, the home network device 102 may have location services 104, such as a GPS receiver, and may transmit the location of the home network device 102 to the monitoring application 140.

The monitoring application 140 may also determine a location of the primary device 103 and store the location in the device location data 155. In an embodiment, the primary device 103 may be a GPS enabled device that may periodically, upon request, or upon trigger event, transmit a current location, approximate location, or geo-tagged location to the monitoring application 140. The monitoring application 140 may store the location of the primary device 103 in the device location data 155. As further described below, the primary device 103 may be within communication range of the secondary device 106, and the primary device 103 may detect a presence of any secondary devices 106 according to various methods of short-range communication.

In an embodiment, the geographic zone 134 may be based on the location of the home network device 102 and may be a physical area surrounding the home network device 102, when one is present. However, when a home network device 102 is not present, and a primary device 103 may be acting as a hotspot device, then the geographic zone 134 may be based on the location of the primary device 103, and may be a physical area surrounding the primary device 103.

At step 211, the monitoring application 140 may monitor for secondary devices 106 entering the geographic zone 134, of either the home network device 102 or the primary device 103. At step 213, the monitoring application 140 may detect that the secondary device 106 has entered the geographic zone 134, and may obtain a location of the secondary device 106. The monitoring for secondary devices 106 and obtaining the location of the secondary device 106, at steps 211 and 213, may be performed in a variety of different ways. In one embodiment, the secondary device 106 may be GPS-enabled, and thus may transmit the location of the secondary device 106, for example, upon request by the monitoring application 140 via API 150. In another embodiment, another device, such as a primary device 103, having a known location in the device location data 155 and being within a certain range of the secondary device 106, may detect the presence of the secondary device 106. The presence may be detected using, for example, various types of short-range communication mechanisms (e.g., BLU-ETOOTH, NFC, etc.). In this case, the primary device 103 may transmit an indication that the secondary device 106 is within short field communication range of the primary device 103 to the monitoring application 140, via the API 105, for example. In another embodiment, the monitoring application 140 may determine a location of the secondary device 106 based on locations of nearby wireless access points, hotspots, or cell towers. For example, the monitoring application 140 may determine a location of the secondary device 106 using trilateration based on one or more cell sites 114 within range of the secondary device 106, or by performing a Wi-Fi look up based on known locations of Wi-Fi access points with reported service set identifiers (SSIDs). As should be appreciated, the method by which the monitoring application 140 monitors for a secondary device 106 entering the geographic zone 134 and determines the location of the secondary device 106 is not limited herein. In an embodiment, the monitoring application 140 may store the location of the secondary device 106 in the device location data 155.

At step 215, the monitoring application 140 may determine whether the secondary device 106 is within the geographic zone 134. In an embodiment, the monitoring application 140 may compare the location of the secondary device 106 with a location region or area of the geographic zone 134 to determine whether the secondary device 106 is within the geographic zone 134.

When the secondary device 106 is indeed within the geographic zone 134, the billing application 144 of the billing adaptor system 110 may transmit an instruction via, for example, API 150, to the billing system 136 of the core network 120 to adapt or adjust a data plan 128 of the secondary device 106. In an embodiment, the instruction may identify the device identifier 126 of the secondary device 106 and the corresponding data plan 128. The instruction may instruct the billing system 136 to reduce a billing rate of the data plan 128 to a zero rate or a reduced rate, relative to the original billing rate. A zero rate indicates that the billing system 136 may not separately bill the subscriber for data usage on the secondary device 106, when the secondary device 106 is within the geographic zone 134. A reduced rate indicates that the billing system 136 may reduce the billing rate for data usage on the secondary device 106 to a rate lower than the original rate, which was previously subscribed for by the subscriber. For example, the reduced rate may be based on a distance of the secondary device 106 from the home network device 102 or the primary device 103. At step 221, the billing system 136 performs the instruction to adapt or adjust the data plan 128 of the secondary device 106, and reduce the billing rate in the data plan 128. The billing system 136 may determine whether to adjust the billing rate to a reduced rate or zero rate based on, for example, a policy associated with the program for reduced billing rates, for which the subscriber may have subscribed.

In an embodiment, the monitoring application 140 may be pre-configured to only transmit the instruction to adapt the data plan 128 of the secondary device 106 according to a preset schedule (i.e., at certain time intervals). The preset schedule may correspond to a promotion offered by the carrier, indicating that customers may receive a reduced billing rate for devices within the home of the customer at certain times of the day. For example, the monitoring application 140 may continuously or periodically determine whether the secondary device 106 is within the geographic zone 134 at step 215, but may only transmit the instruction at step 218 during the permitted times indicated in the preset schedule.

In an embodiment, the billing and adaptor system 110 may adapt the billing rate for multiple devices 106 registered with the carrier, when the devices 106 enter a geographic zone 134 of an event held at a point of interest 137. For example, the carrier may offer a promotion in which registered devices 106 operating in a stadium during a particular concert is offered a reduced billing rate, only when the device 106 is within the geographic zone 134 of the venue and only during the time of the concert. In this case, a home network device 102 or a primary device 103 may be present within the concert venue, and the carrier may have preset the geographic zone 134 to encompass the entire concert venue. At step 218, the monitoring application 140 may determine all the secondary devices 106 that enter the concert venue and thus enter the geographic zone 134 during the time of the concert. When the secondary devices enter the geographic zone 134 during the concert time, the monitoring application 140 may transmit instructions to the billing system to adapt the data plan 128 of all of the secondary devices 106 entering the concert venue during the concert time. At step 221, the billing system 136 may adapt the data plan 128 of each of the secondary devices 106, seamlessly in the background without user involvement, to temporarily reduce the billing rate or apply a zero billing rate for the secondary devices 106 during the concert.

Figure 3:
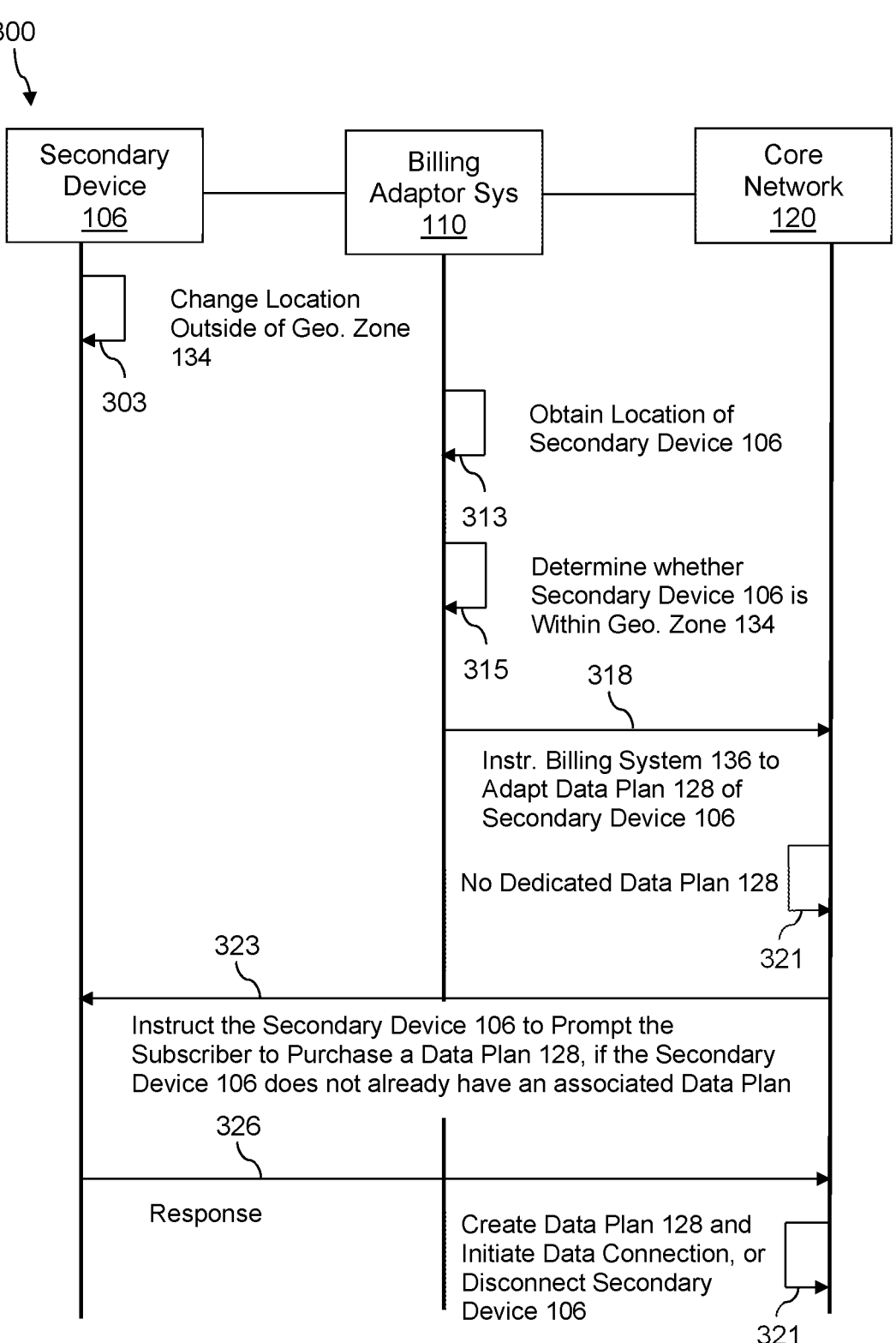
FIG. 3 is a message sequence diagram of a second example method performed by the communication system of FIG. 1 according to an embodiment of the disclosure.

Turning now to FIG. 3, shown is a message sequence diagram illustrating a method 300, performed by the secondary device 106, the billing adaptor system 110, and the core network 120, similar to method 200 of FIG. 2. Method 300 may be performed after the subscriber has purchased the home network device 102, the home network subscription plan 132, and the secondary device 106. Unlike method 200 of FIG. 2, the secondary device 106 may not be associated with a data plan 128 in method 300 of FIG. 3. For example, the subscriber or customer may simply have purchased the secondary device 106 for use, without purchasing an associated data plan 128, perhaps because the secondary device 106 is Wi-Fi-enabled.

In an embodiment, method 300 may be performed after the monitoring application 140 has determined that the secondary device 106 is within the geographic zone 134 and that the secondary device 106 is associated with a subscription account 124 that has opted-in to the service of reducing billing rates upon certain conditions. Similarly, method 300 may be performed after the billing application 144 has transmitted an instruction to the billing system 136, to adapt the data plan 128 of the secondary device 106. Since the secondary device 106 is not associated with a dedicated data plan 128, then the instruction to the billing system 136 may include an instruction to provide a zero billing rate for the secondary device 106, when the secondary device 106 is in the geographic zone 134. In an embodiment, the zero billing rate refers to the carrier providing the secondary device 106 a data connection to the carrier network 108 and the Internet, free of charge.

At step 303, the secondary device 106 may change location to a location outside of the geographic zone 134. For example, when the secondary device 106 is an in-vehicle communication system inside a vehicle of the subscriber, the vehicle may sometimes be present at the home of the subscriber, and may often leave the home as well. In this example, the vehicle, and thus the in-vehicle communication system, may have left the home of the subscriber at step 303.

At step 313, the monitoring application 140 of the billing adaptor system 100 may determine a location of the secondary device 106. In an embodiment, the monitoring application 140 may be triggered to determine the location of the secondary device 106 each time a secondary device 106 enters or exists the geographic zone 134. Step 313 may be performed in a manner similar to step 213 of method 200 to determine the location of the secondary device 106.

At step 315, the monitoring application 140 may determine whether the secondary device 106 is located within the geographic zone 134. Step 315 may be performed in a manner similar to step 215 of method 300 to determine whether the secondary device 106 is located within the geographic zone 134. In method 300, the monitoring application 140 may determine that the secondary device 106 is located outside of, or external to, the geographic zone 134.

When the secondary device 106 is located outside of, or external to, the geographic zone 134, the billing application 144 of the billing adaptor system 100 may transmit an instruction via, for example, API 150, to the billing system 136 of the core network 120, at step 318. The instruction may be for the billing system 136 to adapt or adjust a data plan 128 of the secondary device 106 such that the billing rate for the secondary device 106 is increased to a billing rate indicated in a dedicated data plan 128 purchased in association with the secondary device 106. However, at step 321, the billing system 136 may determine that the secondary device 106 is not associated with a dedicated data plan 128. The billing system 136 may also determine that the secondary device 106 is not associated with a billing rate by which to bill data usage when the secondary device 106 is external to geographic zone 134.

In this situation, in one embodiment, the billing system 136 may instruct other components in the core network 120 to discontinue network connectivity to the secondary device 106, when the secondary device 106 is external to the geographic zone 134. For example, the core network 120 may instruct one or more network elements in the carrier network 108 to discontinue or drop traffic to and from the secondary device 106.

In another embodiment, the billing system 136, or the billing application 144 in the billing adaptor system 110 may transmit an instruction to the secondary device 106, at step 323. The instruction may be to prompt the subscriber to purchase a data plan 128, such that the billing system 136 may apply a billing rate to data usage occurring external to the geographic zone 134. For example, the instruction may trigger the secondary device 106 to display, via a user interface on a display of the secondary device 106, multiple data plans for purchase available for the secondary device 106, each data plan associated with a different charge and permitted data usage. Alternatively, the instruction may trigger the secondary device 106 to display, via the user interface, an application or website of the carrier indicating several different data plans offered for the secondary device 106 for selection.

When a selection of a particular data plan 128 is received, and a payment method is either manually entered or selected via the user interface, the secondary device 106 may transmit a response to the billing system 136 at the core network 120, at step 326. The response may include an indication of the selected data plan 128, and other identification information of the secondary device 106. At step 321, the billing system 136 may create and store the selected data plan 128 in association with the secondary device 106 and/or the subscriber, to implement billing services according to the selected data plan 128. The core network 120 may initiate the data connection for the secondary device 106 according to the data plan 128, when the secondary device 106 is external to the geographic zone 134.

In another embodiment, when the subscriber does not select a data plan 128 for the secondary device 106 when the secondary device 106 is outside the geographic zone, the core network 120 may discontinue network connectivity to the secondary device 108. For example, the core network 120 may instruct one or more network elements in the carrier network 108 to discontinue or drop traffic to and from the secondary device 106.

Turning now to FIG. 4, a method 400 is described. Method 400 may be performed by the monitoring application 140 and the billing application 144 of the billing adaptor system. In an embodiment, method 400 may be performed after the subscriber has purchased the home network device 102, the home network subscription plan 132, the secondary device 106, and/or a data plan 128 corresponding to the secondary device 106.

At block 403, method 400 comprises obtaining, by the monitoring application 140, a location of the secondary device 106, registered with the carrier network 108, in association with a subscription account 124. In an embodiment, the subscription account 124 comprises a home network subscription plan 132 associated with a home network device 102 registered with the carrier network 108. In an embodiment, the secondary device 106 is registered with the carrier network 108 under a data plan 128 separate from the home network subscription plan 132.

At block 406, method 400 comprises determining, by the monitoring application 140, a location of the home network device 102. In another embodiment, at block 406, method 400 may comprise determining, by the monitoring application 140, a location of the primary device 103.

At block 409, method 400 comprises determining, by the monitoring application 140, a geographic zone 134 around the home network device 102 based on the secondary device 102. The geographic zone 134 may be a physical area around, surrounding, or proximate to the home network device 102. In another embodiment, the geographic zone 134 may be a physical area around, surrounding, or proximate to a primary device 103. In this embodiment, at block 409, method 400 may comprise determining, by the monitoring application 140, a geographic zone 134 around the primary device 103 based on the secondary device 102.

At block 412, method 400 comprises determining, by the monitoring application 140, whether the location of the secondary device 103 is within the geographic zone 134 around the home network device 102. In an embodiment in which the geographic zone 134 is an area around the primary device 103, then method 400 may comprise, at block 412, determining, by the monitoring application 140, whether the location of the secondary device 103 is within the geographic zone 134 around the primary device 103.

At block 415, method 400 comprises transmitting, by a billing application 144 of the billing adaptor system 110, an instruction to a billing system 136 in the carrier network 108 when the location of the secondary device 106 is within the geographic zone 134 around the home network device 102. The instruction may be to adapt the data plan 128 associated with the secondary device 108 to a reduced billing rate, relative to the original billing rate of the data plan 128.

Figure 5:
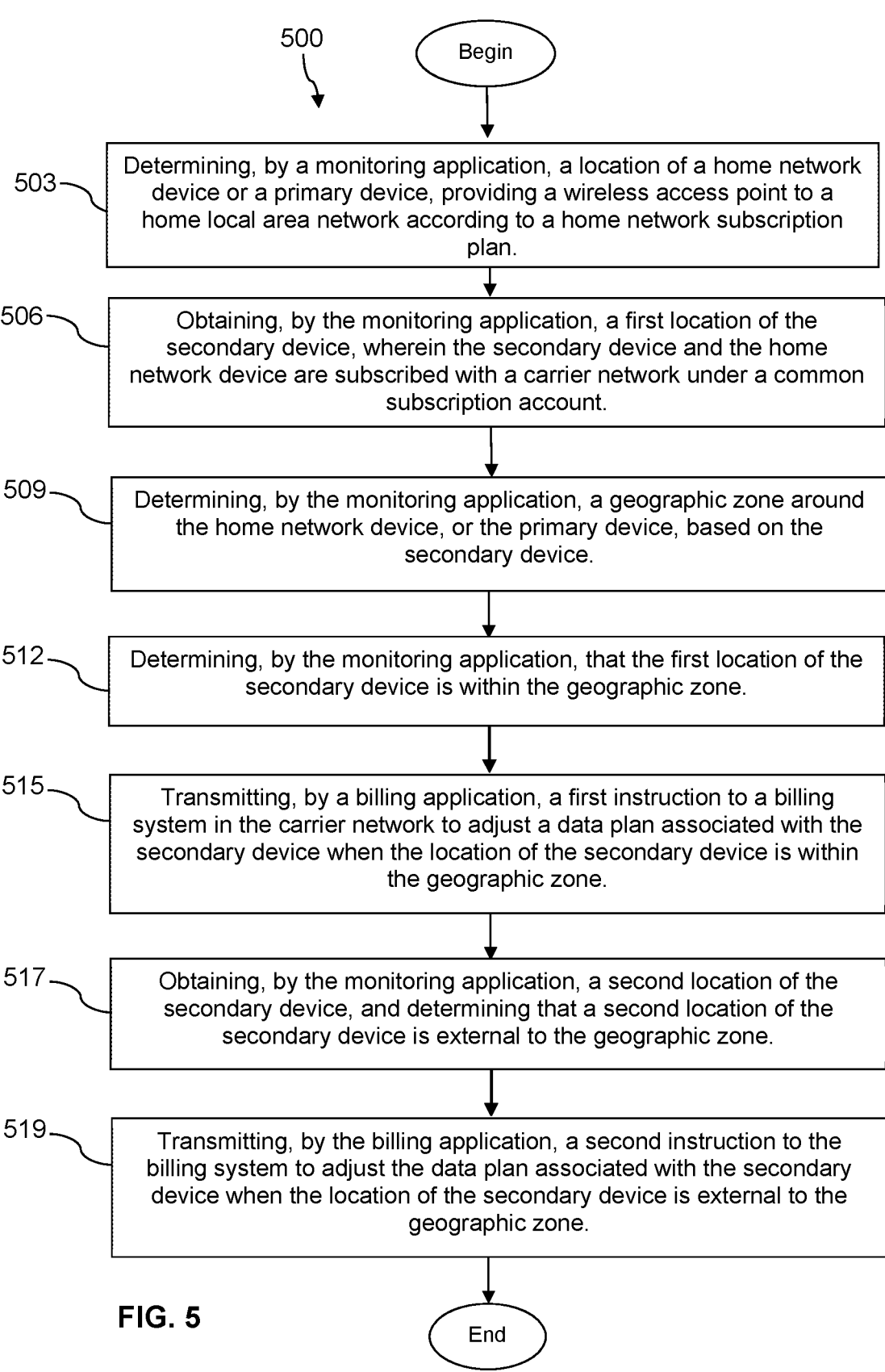
FIG. 5 is a flow chart of a second method performed by the billing adaptor system in the communications system of FIG. 1 according to an embodiment of the disclosure.

Turning now to FIG. 5, a method 500 is described. Method 500 may be performed by the monitoring application 140 and the billing application 144 of the billing adaptor system. In an embodiment, method 500 may be performed after the subscriber has purchased the home network device 102, the home network subscription plan 132, the secondary device 106, and/or a data plan 128 corresponding to the secondary device 106.

At block 503, method 500 comprises determining, by the monitoring application 140, a location of the home network device 102 and/or a primary device 103. The home network device 102 may act as a wireless access point to a home local area network according to a home network subscription plan 132. In another embodiment, the primary device 103 may act as the wireless access point to the home local area network according to the home network subscription plan 132.

At block 506, method 500 comprises obtaining, by the monitoring application 140, a first location of the secondary device 106. In an embodiment, the secondary device 106, the home network device 102, and/or the primary device 103 are subscribed with the carrier network 108 under a common subscription account 124. The monitoring application 140 may store the first location in the device location data 155.

At block 509, method 500 comprises determining, by the monitoring application, a geographic zone 134 around the home network device 102 or the primary device 103, based on the secondary device 106. At block 512, method 500 comprises determining, by the monitoring application 140, that the first location of the secondary device 106 is within the geographic zone 134.

At block 515, method 500 comprises transmitting, by the billing application 144, to a billing system 136 in the carrier network 108, a first instruction to adjust a data plan 128 associated with the secondary device 106 when the location of the secondary device 106 is within the geographic zone 134. In an embodiment, the first instruction may specifically be to reduce a billing rate of the data plan 128 associated with the secondary device 106, relative to an original billing rate of the data plan 128.

In an embodiment, the monitoring application 140 may detect that the secondary device 106 has changed locations to a location that is outside the geographic zone 134, which triggers the monitoring application 140 to obtain the second location of the secondary device 106 or triggers the secondary device 106 to transmit the second location to the monitoring application 140. The monitoring application 140 may store the second location in the device location data 155. At block 517, method 500 comprises determining, by the monitoring application 140, that a second location of the secondary device 106, different from the first location of the secondary device 106, is external to the geographic zone 134.

At block 519, method 500 comprises transmitting, by the billing application 144, a second instruction to the billing system 136 to adjust the data plan 128 associated with the secondary device 106 when the location of the secondary device 106 is external to the geographic zone 134. In an embodiment, the second instruction comprises an instruction to adjust a billing rate of the data plan 128 to be the original billing rate of the data plan 128, which was originally subscribed for by the customer.

Figure 6A:
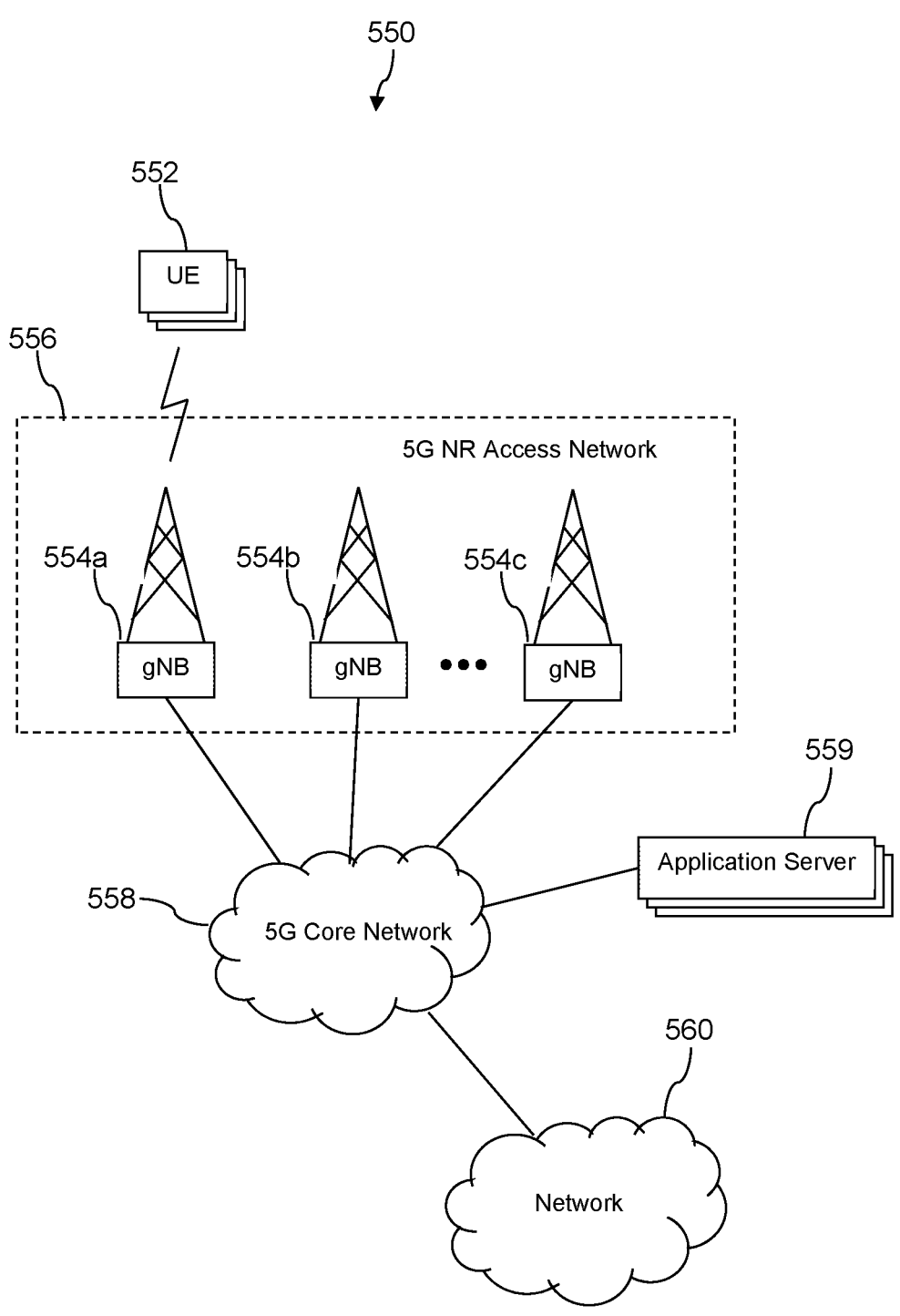
FIGS. 6A-B are block diagrams illustrating a communication system similar to the communication system of FIG. 1 according to an embodiment of the disclosure.

Turning now to FIG. 6A, an exemplary communication system 550 is described. In an embodiment, the communication system 550 may be implemented in the system 100 of FIG. 1. The communication system 550 includes a number of access nodes 554 that are configured to provide coverage in which UEs 552, such as cell phones, tablet computers, machine-type-communication devices, tracking devices, embedded wireless modules, and/or other wirelessly equipped communication devices (whether or not user operated), or devices such as the primary device 103 and secondary device 106, can operate. The access nodes 554 may be said to establish an access network 556. The access network 556 may be referred to as RAN in some contexts. In a 5G technology generation an access node 554 may be referred to as a gigabit Node B (gNB). In 4G technology (e.g., LTE technology) an access node 554 may be referred to as an eNB. In 3G technology (e.g., CDMA and GSM) an access node 554 may be referred to as a base transceiver station (BTS) combined with a base station controller (BSC). In some contexts, the access node 554 may be referred to as a cell site or a cell tower. In some implementations, a picocell may provide some of the functionality of an access node 554, albeit with a constrained coverage area. Each of these different embodiments of an access node 554 may be considered to provide roughly similar functions in the different technology generations.

In an embodiment, the access network 556 comprises a first access node 554a, a second access node 554b, and a third access node 554c. It is understood that the access network 556 may include any number of access nodes 554. Further, each access node 554 could be coupled with a core network 558 that provides connectivity with various application servers 559 and/or a network 560. In an embodiment, at least some of the application servers 559 may be located close to the network edge (e.g., geographically close to the UE 552 and the end user) to deliver so-called "edge computing." The network 560 may be one or more private networks, one or more public networks, or a combination thereof. The network 560 may comprise the public switched telephone network (PSTN). The network 560 may comprise the Internet. With this arrangement, a UE 552 within coverage of the access network 556 could engage in air-interface communication with an access node 554 and could thereby communicate via the access node 554 with various application servers and other entities.

The communication system 550 could operate in accordance with a particular radio access technology (RAT), with communications from an access node 554 to UEs 552 defining a downlink or forward link and communications from the UEs 552 to the access node 554 defining an uplink or reverse link. Over the years, the industry has developed various generations of RATs, in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO).

Recently, the industry has been exploring developments in "5G" and particularly "5G NR" (5G New Radio), which may use a scalable OFDM air interface, advanced channel coding, massive MIMO, beamforming, mobile mmWave (e.g., frequency bands above 24 GHz), and/or other features, to support higher data rates and countless applications, such as mission-critical services, enhanced mobile broadband, and massive Internet of Things (IoT). 5G is hoped to provide virtually unlimited bandwidth on demand, for example providing access on demand to as much as 20 gigabits per second (Gbps) downlink data throughput and as much as 10 Gbps uplink data throughput. Due to the increased bandwidth associated with 5G, it is expected that the new networks will serve, in addition to conventional cell phones, general internet service providers for laptops and desktop computers, competing with existing ISPs such as cable internet, and also will make possible new applications in internet of things (IoT) and machine to machine areas.

In accordance with the RAT, each access node 554 could provide service on one or more radio-frequency (RF) carriers, each of which could be frequency division duplex (FDD), with separate frequency channels for downlink and uplink communication, or time division duplex (TDD), with a single frequency channel multiplexed over time between downlink and uplink use. Each such frequency channel could be defined as a specific range of frequency (e.g., in radio-frequency (RF) spectrum) having a bandwidth and a center frequency and thus extending from a low-end frequency to a high-end frequency. Further, on the downlink and uplink channels, the coverage of each access node 554 could define an air interface configured in a specific manner to define physical resources for carrying information wirelessly between the access node 554 and UEs 552.

Without limitation, for instance, the air interface could be divided over time into frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval (TTI), the resource elements on the downlink and uplink could be grouped to define physical resource blocks (PRBs) that the access node could allocate as needed to carry data between the access node and served UEs 552.

In addition, certain resource elements on the example air interface could be reserved for special purposes. For instance, on the downlink, certain resource elements could be reserved to carry synchronization signals that UEs 552 could detect as an indication of the presence of coverage and to establish frame timing, other resource elements could be reserved to carry a reference signal that UEs 552 could measure in order to determine coverage strength, and still other resource elements could be reserved to carry other control signaling such as PRB-scheduling directives and acknowledgement messaging from the access node 554 to served UEs 552. And on the uplink, certain resource elements could be reserved to carry random access signaling from UEs 552 to the access node 554, and other resource elements could be reserved to carry other control signaling such as PRB-scheduling requests and acknowledgement signaling from UEs 552 to the access node 554.

The access node 554, in some instances, may be split functionally into a radio unit (RU), a distributed unit (DU), and a central unit (CU) where each of the RU, DU, and CU have distinctive roles to play in the access network 556. The RU provides radio functions. The DU provides L1 and L2 real-time scheduling functions; and the CU provides higher L2 and L3 non-real time scheduling. This split supports flexibility in deploying the DU and CU. The CU may be hosted in a regional cloud data center. The DU may be co-located with the RU, or the DU may be hosted in an edge cloud data center.

Figure 6B:
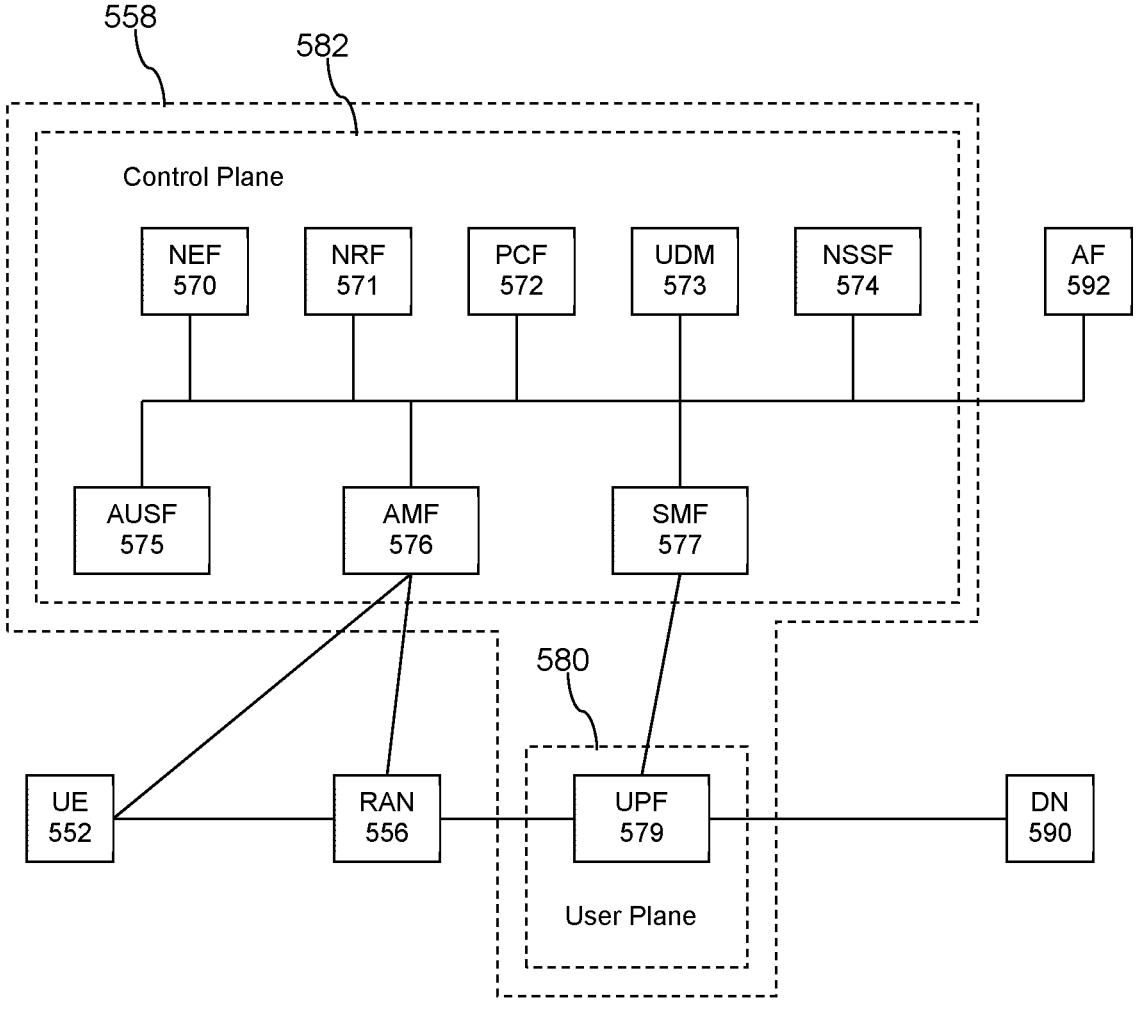

Turning now to FIG. 6B, further details of the core network 558 are described. In an embodiment, the core network 558 is a 5G core network. 5G core network technology is based on a service based architecture paradigm. Rather than constructing the 5G core network as a series of special purpose communication nodes (e.g., an HSS node, an MME node, etc.) running on dedicated server computers, the 5G core network is provided as a set of services or network functions. These services or network functions can be executed on virtual servers in a cloud computing environment which supports dynamic scaling and avoidance of long-term capital expenditures (fees for use may substitute for capital expenditures). These network functions can include, for example, a user plane function (UPF) 579, an authentication server function (AUSF) 575, an access and mobility management function (AMF) 576, a session management function (SMF) 577, a network exposure function (NEF) 570, a network repository function (NRF) 571, a policy control function (PCF) 572, a unified data management (UDM) 573, a network slice selection function (NSSF) 574, and other network functions. The network functions may be referred to as virtual network functions (VNFs) in some contexts.

Network functions may be formed by a combination of small pieces of software called microservices. Some microservices can be re-used in composing different network functions, thereby leveraging the utility of such microservices. Network functions may offer services to other network functions by extending application programming interfaces (APIs) to those other network functions that call their services via the APIs. The 5G core network 558 may be segregated into a user plane 580 and a control plane 582, thereby promoting independent scalability, evolution, and flexible deployment.

The UPF 579 delivers packet processing and links the UE 552, via the access network 556, to a data network 590 (e.g., the network 560 illustrated in FIG. 6A). The AMF 576 handles registration and connection management of non-access stratum (NAS) signaling with the UE 552. Said in other words, the AMF 576 manages UE registration and mobility issues. The AMF 576 manages reachability of the UEs 552 as well as various security issues. The SMF 577 handles session management issues. Specifically, the SMF 577 creates, updates, and removes (destroys) protocol data unit (PDU) sessions and manages the session context within the UPF 579. The SMF 577 decouples other control plane functions from user plane functions by performing dynamic host configuration protocol (DHCP) functions and IP address management functions. The AUSF 575 facilitates security processes.

The NEF 570 securely exposes the services and capabilities provided by network functions. The NRF 571 supports service registration by network functions and discovery of network functions by other network functions. The PCF 572 supports policy control decisions and flow based charging control. The UDM 573 manages network user data and can be paired with a user data repository (UDR) that stores user data such as customer profile information, customer authentication number, and encryption keys for the information. An application function 592, which may be located outside of the core network 558, exposes the application layer for interacting with the core network 558. In an embodiment, the application function 592 may be execute on an application server 559 located geographically proximate to the UE 552 in an "edge computing" deployment mode. The core network 558 can provide a network slice to a subscriber, for example an enterprise customer, that is composed of a plurality of 5G network functions that are configured to provide customized communication service for that subscriber, for example to provide communication service in accordance with communication policies defined by the customer. The NSSF 574 can help the AMF 576 to select the network slice instance (NSI) for use with the UE 552.

Figure 7:
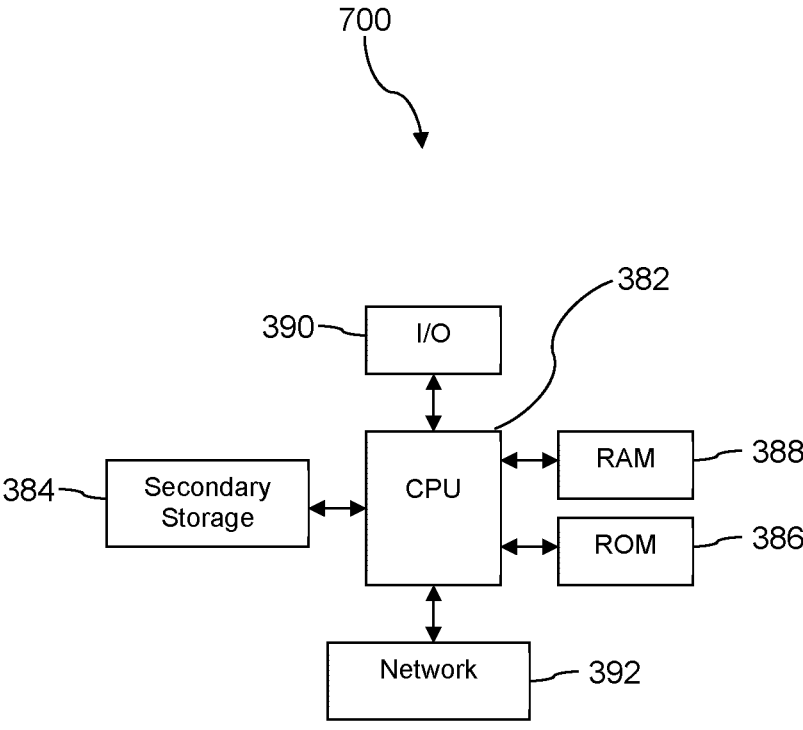
FIG. 7 is a block diagram of a computer system implemented within the communication system of FIG. 1 according to an embodiment of the disclosure.

FIG. 7 illustrates a computer system 700 suitable for implementing one or more embodiments disclosed herein. In an embodiment, the primary device 103, the secondary device 106, and/or the billing adaptor system 110 may be implemented as the computer system 700. The computer system 700 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 700, at least one of the CPU 382, the RAM 388, and the ROM 386 are changed, transforming the computer system 700 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 700 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), and radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 700 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 700 to provide the functionality of a number of servers that is not directly bound to the number of computers in the computer system 700. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 700, at least portions of the contents of the computer program product to the secondary storage 384, to the ROM 386, to the RAM 388, and/or to other non-volatile memory and volatile memory of the computer system 700. The processor 382 may process the executable instructions and/or data structures in part by directly accessing the computer program product, for example by reading from a CD-ROM disk inserted into a disk drive peripheral of the computer system 700. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 700.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 700 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method performed by a billing adaptor system to adjust a billing rate of a user device subscribed to a subscription account including a home network subscription plan, wherein the method comprises:

determining, by a monitoring application of the billing adaptor system, a location of a primary device, wherein the primary device provides a wireless access point to a home local area network according to the home network subscription plan, and wherein the user device and the primary device are each subscribed to the subscription account under separate plans;

obtaining, by the monitoring application, a first location of the user device, wherein the user device is subscribed to the subscription account according to a data plan associated with the user device and which is separate from the home network subscription plan;

determining, by the monitoring application, a geographic zone around the primary device, based on the user device;

determining, by the monitoring application, a location of the user device;

responsive to the location of the user device being within the geographic zone, transmitting, by a billing application of the billing adaptor system, a first instruction to a billing system in the carrier network to adjust the data plan associated with the user device; and responsive to the location of the user device being external to the geographic zone transmitting, by the billing application, a second instruction to the billing system to adjust the data plan associated with the user device.

2. The method of claim 1, wherein the first instruction comprises an instruction to adjust the data plan associated with the user device to a reduced or zero billing rate, and wherein the second instruction comprises an instruction to adjust a billing rate of the data plan to be an original billing rate of the data plan.

3. The method of claim 1, wherein the second instruction comprises an instruction to discontinue network services to the user device when the second location of the user device is external to the geographic zone.

4. The method of claim 1, further comprising:

receiving, by the monitoring application, the first location of the user device when the user device enters the geographic zone; and receiving, by the monitoring application, the second location of the user device when the user device exits the geographic zone.

5. The method of claim 1, wherein the geographic zone around the home network device is determined based on a type of the user device.

6. The method of claim 1, wherein the geographic zone around the home network device is determined based on a quality of service parameter associated with the user device.

7. A method performed by a billing adaptor system to adjust a billing rate of a user device within a geographic area, wherein the method comprises:

obtaining, by a monitoring application of the billing adaptor system, a location of the user device registered with a carrier network in association with a subscription account, wherein the subscription account comprises a home network subscription plan associated with a home network device registered with the carrier network, wherein the user device is registered with the carrier network under a data plan associated with the subscription account and separate from the home network subscription plan;

determining, by the monitoring application, a location of the home network device;

determining, by the monitoring application, a geographic zone around the home network device based on the user device, wherein the geographic zone is a physical area around the home network device;

determining, by the monitoring application, whether the location of the user device is within the geographic zone around the home network device; and transmitting, by a billing application of the billing adaptor system, an instruction to the billing adaptor system in the carrier network to adapt the data plan associated with the user device to a reduced billing rate when the location of the user device is within the geographic zone around the home network device.

8. The method of claim 7, wherein the location of the home network device is a home address indicated in the subscription account, and wherein determining, by the monitoring application, a location of the home network device comprises receiving a home address indicated in the subscription account from a core network in the carrier network.

9. The method of claim 7, further comprising receiving, by the monitoring application, from the user device, a location of the user device when the device is Global Positioning System (GPS) enabled, or determining, by the monitoring application, the location of the user device using trilateration based on cell sites accessible to the user device.

10. The method of claim 7, further comprising determining, by the monitoring application, a location of the user device by:

receiving, by the monitoring application, a location of a primary device within communication range of the user device;

receiving, by the monitoring application, a message from the primary device indicating that the user device is within communication range of the primary device; and determining, by the monitoring application, the location of the user device based on the location of the primary device based on the message from the primary device.

11. The method of claim 7, wherein the geographic zone around the home network device is determined based on a type of the user device.

12. The method of claim 7, wherein the geographic zone around the home network device is determined based on a quality of service parameter associated with the user device.

13. The method of claim 7, wherein the reduced billing rate is lower than an original billing rate associated with the data plan or is a zero billing rate.

14. A system comprising:

at least one processor;

at least one non-transitory memory;

a monitoring application of a billing adaptor system, stored in the at least one non-transitory memory, which when executed by the at least one processor, causes the at least one processor to be configured to:

determine a geographic zone around a first device based on a second device, wherein the second device and the first device are subscribed with a carrier network under a common subscription account;

obtain a first location of the second device;

when the first location of the second device is within the geographic zone, a billing application of the billing adaptor system, stored in the at least one non-transitory memory, which when executed by the at least one processor, causes the at least one processor to be configured to transmit a first instruction to a billing system in the carrier network to adjust a data plan associated with the second device;

after transmitting the first instruction, the monitoring application causes the at least one processor to be configured to determine that a second location of the second device, different from the first location of the second device, is external to the geographic zone; and when the second location of the second device is external to the geographic zone, the billing application causes the at least one processor to be configured to a second instruction to the billing system to adjust the data plan associated with the second device.

15. The system of claim 14, wherein the first instruction comprises an instruction to adjust the data plan associated with the second device to a reduced or zero billing rate, and wherein the second instruction comprises an instruction to adjust a billing rate of the data plan to be an original billing rate of the data plan.

16. The system of claim 14, wherein the second instruction comprises an instruction to discontinue network services to the second device when the second location of the second device is external to the geographic zone.

17. The system of claim 14, wherein the common subscription account indicates the data plan of the second device and a home network subscription plan associated with the home network device.

18. The system of claim 14, wherein the geographic zone around the home network device is determined based on a type of the second device.

19. The system of claim 14, wherein the geographic zone around the home network device is determined based on a quality of service parameter associated with the second device.

20. The system of claim 14, wherein the monitoring application causes the at least one processor to be configured to:

receive, from the second device, the first location or the second location of the second device when the second device is Global Positioning System (GPS) enabled; or determine the first location or the second location of the second device using trilateration based on cell sites accessible to the second device or using Wi-Fi lookups.

\* \* \* \* \*